US008694632B1

(12) United States Patent
Shubina et al.

(10) Patent No.: US 8,694,632 B1
(45) Date of Patent: Apr. 8, 2014

(54) DETERMINING CONTENT ITEM EXPANSION PREDICTION ACCURACY

(75) Inventors: Ksenia Shubina, Vaughan (CA); Pavel Kobyakov, Waterloo (CA)

(73) Assignee: Google Inc., Mountain View, CA (US)

( * ) Notice: Subject to any disclaimer, the term of this patent is extended or adjusted under 35 U.S.C. 154(b) by 142 days.

(21) Appl. No.: 13/551,189

(22) Filed: Jul. 17, 2012

(51) Int. Cl.
*G06F 15/16* (2006.01)
*G06F 15/173* (2006.01)

(52) U.S. Cl.
USPC ........... 709/224; 709/203; 709/218; 709/217; 709/205; 709/225; 709/201; 705/321; 706/52; 706/45

(58) Field of Classification Search
USPC .......... 709/224, 203, 218, 217, 205, 225, 201
See application file for complete search history.

(56) References Cited

U.S. PATENT DOCUMENTS

| | | | |
|---|---|---|---|
| 6,615,251 B1* | 9/2003 | Klug et al. | 709/218 |
| 6,973,436 B1 | 12/2005 | Shkedi | |
| 8,237,937 B2* | 8/2012 | Sugiyama et al. | 358/1.13 |
| 8,578,057 B2* | 11/2013 | Omar et al. | 709/246 |
| 2002/0042786 A1* | 4/2002 | Scarborough et al. | 706/21 |
| 2002/0046199 A1* | 4/2002 | Scarborough et al. | 706/21 |
| 2002/0152305 A1* | 10/2002 | Jackson et al. | 709/224 |
| 2007/0299857 A1 | 12/2007 | Gwozdz et al. | |
| 2009/0299862 A1 | 12/2009 | Fan et al. | |
| 2010/0313129 A1 | 12/2010 | Hyman | |
| 2011/0055685 A1 | 3/2011 | Jaquish et al. | |
| 2011/0153435 A1 | 6/2011 | Pisaris-Henderson | |
| 2011/0161990 A1 | 6/2011 | Smith et al. | |
| 2012/0101907 A1 | 4/2012 | Dodda | |

FOREIGN PATENT DOCUMENTS

WO WO0019332 A9 10/2001

OTHER PUBLICATIONS

Gilbert, David, "Set IFRAME height based on size of remotely loaded content", solidgone Blog, Mar. 13, 2010, XP055066250, Retrieved from the Internet: URL:http://solidgone.org/Set-IFRAME-height-based-on-size-of-remotely-loaded-content [retrieved on Jun. 11, 2013], abstract, 10 pages.

Peters, 'Iframe loading techniques and performance', aaronpeters.nl, Dec. 20, 2010, on line at aaronpeters.nl/blog/iframeloading-techniques-performance?%3E", 11 pages.

How do iframe busters for expandable ads work?; javascript—How do iframe busters for expandable ads work?—Stack Overflow; http://stackoverflow.com/questions/5553469/how-do-iframe-busters-for-expandable-ads-work; Aug. 15, 2012; 3 pages.

(Continued)

*Primary Examiner* — Jude Jean Gilles
(74) *Attorney, Agent, or Firm* — Fish & Richardson P.C.

(57) ABSTRACT

Methods, and systems, including computer programs encoded on computer-readable storage mediums, including a method for determining accuracy measures for predicted expansion directions for content item environments. The method includes, identifying a predicted expansion direction for the content item environment; generating a serving data log entry for the request specifying the predicted expansion direction and a unique identifier for the request; providing an expandable content item having the predicted expansion direction and response data specifying the unique identifier; receiving reporting messages specifying the display configurations of the resources and content item environments; determining pairs of serving data log entries and reporting messages based on the unique identifiers, each pair having a matching unique identifier; and determining an accuracy measure for the respective predicted expansion direction based on a comparison of the respective predicted expansion direction and the display configurations of the respective resource and content item environment.

20 Claims, 5 Drawing Sheets

(56) References Cited

OTHER PUBLICATIONS

Introducing expandable ads on AdSense sites—Inside AdSense; Inside AdSense Blog; http://adsense.blogspot.com/2009/03/introducing-expandable-ads-on-adsense.html; Aug. 14, 2012; Mar. 4, 2009; 8 pages.

Macro overview; dfp DoubleClick for Publishers; http://support.google.com/dfp_premium/bin/answer.py?hl=en&answer=1242718; Aug. 14, 2012; 7 pages.

Expanding Options in Expandable Ads; Jun. 4, 2009; Wegert, Tessa; ClickZ/Marketing News & Expert Advise; http://www.clickz.com/clickz/column/1699404/expanding-options-expandable-ads; Aug. 15, 2012; 3 pages.

* cited by examiner

DETERMINING CONTENT ITEM EXPANSION PREDICTION ACCURACY

BACKGROUND

This specification generally relates to information presentation.

Sponsored content (e.g. advertisements) can be provided over the Internet to various user devices. For example, a resource (e.g., web page) can include content item environments (e.g., advertisement slots) in which sponsored content can be presented. These environments can be defined in the resource or defined for presentation with the resource, for example, along with search results or other content. Sponsored content can also be delivered through dedicated web portals or applications executing on the user devices.

SUMMARY

In general, one aspect of the subject matter described in this specification can be implemented in methods that include, for each request for content items received from a user device for an expandable content item to be displayed in a content item environment on a resource and specifying a resource address of the resource, identifying, from one or more predicted expansion directions, a predicted expansion direction for the content item environment based at least in part on the resource address. The predicted expansion direction specifies a predicted direction for expansion of the content item environment displayed on the resource based at least in part on a display configuration of the resource. The method includes generating a serving data log entry for the request specifying the predicted expansion direction and a unique identifier for the request and providing to the user device an expandable content item having the predicted expansion direction and response data specifying the unique identifier. The method further includes receiving reporting messages from the user devices for the respective unique identifiers specifying the display configurations of the respective resources and display configurations of content item environments on the respective resources in which the respective expandable content items were displayed. The method also includes determining pairs of serving data log entries and reporting messages based on the unique identifiers. Each of the pairs is a pair of a serving data entry and a reporting message that have a matching unique identifier; and, for each pair, determining an accuracy measure for the respective predicted expansion direction based at least in part on a comparison of the respective predicted expansion direction and the display configurations of the respective resource and content item environment. The accuracy measure represents an accuracy of the respective predicted expansion direction being a match for the respective resource and content item environment.

Other embodiments of this aspect include corresponding systems, apparatus, and computer programs, configured to perform the actions of the methods, encoded on computer storage devices.

These and other embodiments can each optionally include one or more of the following features. An expandable content item in the expanded form has an area greater than the expandable content item in an initial form. The display configuration of a respective resource specifies a display area of the respective resource and the display configuration of a respective content item environment specifies a display area of the respective content item environment and a relative position of the respective content item environment on the respective resource. The method can include determining whether the respective expandable content item displayed in the respective content item environment in the expanded form in the expansion direction is within the display area of the respective resource based at least in part on the display area of the respective resource and the relative position and display area of the respective content item environment.

The method can include generating the unique identifier for the request based at least in part on the resource address of the resource, a time the request was received, and an apparatus address of an apparatus that received the request. Generating the unique identifier can include generating a fingerprint of the request based at least in part on the resource address of the resource, the time the request was received, and the apparatus address of the apparatus that received the request and designating the fingerprint as the unique identifier.

The method can include providing data specifying the expandable content item and appending data specifying the fingerprint to the data specifying the expandable content. The method can include requesting the predicted expansion direction from a data store storing the one or more predicted expansion directions based at least in part on the resource address of the resource.

Particular implementations of the subject matter described in this specification can be implemented to realize one or more or none of the following advantages. Evaluating the accuracy of predictions of directions in which a content item environment can expand without causing a content item displayed in the environment to be distorted or cause other content on the resource to be distorted permits the predictions to be adjusted if the prediction accuracy is not within an acceptable range. Adjusting the predictions to be more accurate reduces the likelihood that expandable content items will be selected that fail to properly expand, or are distorted or distort other content when expanded, which, in turn, enhances the user experience. Enhancing the user experience can lead, for example, to increased monetization of the expandable content item for the content sponsor.

Increasing the accuracy of expansion direction predictions can lead to more expandable content items being rendered properly, which, in turn, increases the likelihood that advertisers will use more expandable content items. The use of more expandable content items, in turn, increases revenues for publishers as expandable content items are generally more expensive to place than non-expandable content items.

The details of one or more implementations of the subject matter described in this specification are set forth in the accompanying drawings and the description below. Other features, aspects, and advantages of the subject matter will become apparent from the description, the drawings, and the claims.

DETAILED DESCRIPTION

Figure 1:
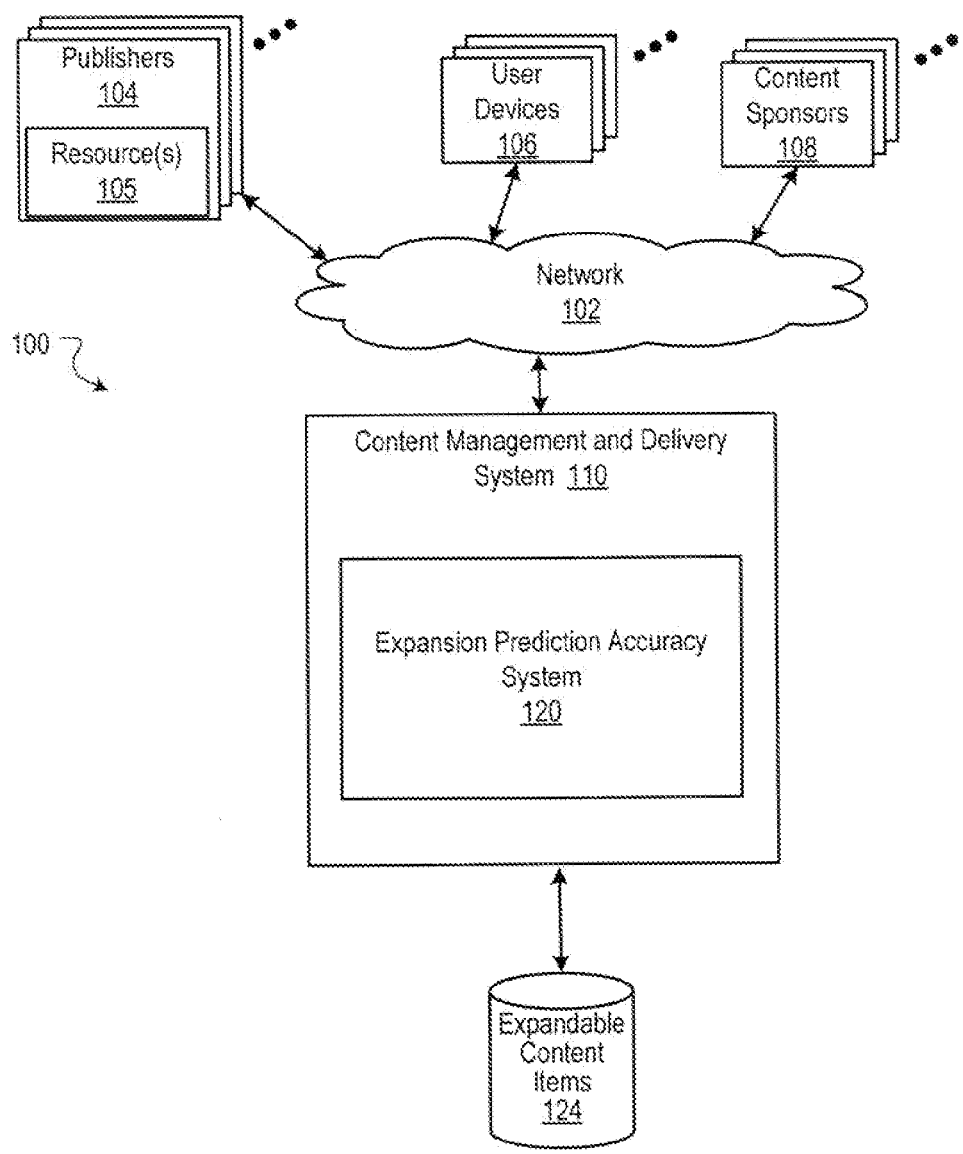
FIG. 1 is a block diagram of an example environment for delivering expandable content.

Some content items are expandable. For example, an expandable content item (e.g., an expandable advertisement) can be initially presented in an unexpanded or initial form (e.g., in a 728×90 pixel form). When an expansion event occurs, the expandable content item can be presented in expanded form (e.g., in a 728×270 pixel form). The expanded form of the expandable content item should "fit" inside the resource as rendered on the browser to prevent unwanted effects such as clipping.

Expandable content items may expand uni-directionally or multi-directionally. A uni-directional expandable content item can only expand in one direction, such as "down," "up," "left," or "right." A multi-directional expandable content item, on the other hand, can expand in two or more directions. For example, a multi-directional expandable content item can include instructions to determine permissible expanding direction(s) (e.g., up/down, left/right) at rendering time, which allows such an item to be served for placement in a content item environment without prior knowledge of the content item environment layout.

Because the content items are served for particular content item environments in a resource, a user device typically requests the content items when the resource is being rendered at the user device. The content item management system that receives the request attempts to select, in response to the request, expandable content items that can expand in a direction for which there is available space for expansion on the resource (e.g., to prevent clipping of the expandable content item or shifting of other content on the resource when the expandable content item is in an expanded form). For example, a content item environment at the top of a resource should not receive an expandable content item that expands only in the "up" direction; rather, it should receive an expandable content item that expands, for example, in the "down" direction.

To select an expandable content item that "fits" within the resource, the content item management system can access and use predictions of directions in which content items displayed on particular resources in particular content display environments can properly expand. Thus, if the predictions are not accurate, then, for example, the expandable content item can be prevented from properly expanding (e.g., if the predicted expansion direction causes the item to expand into a border of the resource).

This description generally relates to generating accuracy measures representing how well predictions of directions in which content item environments can expand without distortion match actual directions in which the content item environments can expand without distortion. For example, if the predicted expansion direction is down and the content item environment (e.g., advertisement slot) is located in the top left corner of the resource (e.g., web page) so that the content item in the content item environment can expand down without being clipped or failing to render, the accuracy measure will be high. Conversely, if the predicted expansion direction is up so that the content item would be clipped or fail to render if it expanded up with the content item environment, the accuracy measure will be low. The actual directions in which content item environments can expand without being or causing distortion can be determined from reporting messages from the user devices rendering the content item environments. Each reporting message includes display configuration data about the content item environment and/or the resource on which it is presented (e.g., the content item environment's relative position on the resource, the content item environment's size, the resource's size, the resource address, or a combination thereof).

More particularly, for each of the content item requests received requesting content items for display in particular content item environments on particular resources, a predicted expansion direction for the content item environment is identified (e.g., from a set of predicted expansion directions). For each request, an expandable content item is provided to the user device that submitted the request. A unique identifier identifying the request is also provided with the expandable content item.

A serving data log entry is generated for each content item request and includes the unique identifier for the content item request and the respective predicted expansion direction(s). A reporting message for each expandable content item is received from the respective user device to which the expandable content item was provided after the resource displaying the expandable content item has been rendered. Each reporting message includes the unique identifier that accompanied the expandable content item, the display configuration of the resource (e.g., size of the web page) and the display configuration of the content item environment in which the expandable content item was displayed (e.g., the size and relative position of the advertisement slot).

The serving data log entries are compared to the reporting messages to identify pairs of serving data log entries and reporting messages that have matching unique identifiers (e.g., a serving data log and reporting message that are caused by the same request). For each serving data log entry/reporting message pair, an accuracy measure is determined to represent how well the predicted expansion direction(s) match the actual expansion direction(s) permitted by the resource and content item environment without distortion (e.g., without clipping of the content item or occluding other resource content when the content item is in its expanded form). For example, the accuracy measure can be determined based on the relative location of the content item environment on the resource and the size of the resource (e.g., the location of the content item environment relative to the borders of the resource). The borders of the resource define the display area of the resource (e.g., the dimensional area of the resource when rendered in which content can be presented). In some implementations, an expansion prediction accuracy system can determine the accuracy measures, as described below.

FIG. 1 is a block diagram of an example environment 100 for delivering expandable content. The example environment 100 includes a content management and delivery system 110 for selecting and providing content to user devices 106. The example environment 100 includes a network 102, such as wide area network (WAN), the Internet, or a combination thereof. The network 102 connects publishers 104, user devices 106, content sponsors 108 (e.g., advertisers that use vendors to serve advertisements), the content management and delivery system 110 and the expansion prediction accuracy system 120. The example environment 100 may include numerous publishers 104, user devices 106, and content sponsors 108.

In some implementations, the content management and delivery system 110 includes a request handler that can receive a request for content from a user device 106, identify one or more content items (which may include one or more expandable content items 124), and provide a content item responsive to the request.

A publisher 104 typically manages a website that includes one or more resources 105 associated with a domain name and hosted by one or more servers. An example website is a collection of web pages formatted in hypertext markup language (HTML) that can contain text, images, multimedia content, and programming elements, such as scripts. Each publisher 104 is an entity that controls, manages and/or owns the website.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources 105 can include content, such as words, phrases, images, video and sounds, that may include embedded information (such as meta-information hyperlinks) and/or embedded instructions (such as scripts). In some implementations, the resources 105 can include sponsored content provided by the content sponsors 108 that can be rendered in specific locations (content item environments) in the resource 105. For example, the resources 105 can include an advertisement, a deal or a special offer sponsored by a content sponsor 108.

A user device 106 is an electronic device that is under control of a user and is capable of requesting and receiving resources 105 over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102.

A user device 106 can request resources 105 from a publisher 104. In turn, data representing the resource 105 can be provided to the user device 106 for presentation by the user device 106. The data representing the resource 105 can also include data specifying a portion of the resource 105 or a portion of a user device display in which content can be presented. These specified portions of the resource 105 or user device display are referred to as content item environments (e.g., content item slots, or, in the case of advertisement content items, advertisement slots).

When a resource 105 is requested by a user device 106 and the resource 105 includes a content item environment in which a content item of a sponsor is to be rendered, the content management system 110 receives a request for a content item. The request for the content item can include characteristics of the content item environments that are defined for the requested resource 105. Such characteristics may include position data that describes the location of the content item environments, and the dimensions of the resource 105 in which the content item environments are rendered. Because the request is generated during the rendering process, the request may be sent before rendering is completed. The position data may be generated such that it reflects the relative position of a slot at the currently rendered state at the time the request is generated. As the rendering may be incomplete, the position data may be inaccurate.

The content management and delivery system 110 can select from the eligible content items that are to be provided to the user device 106 based at least in part, for example, on results of a selection process (e.g., auction). For expandable content items, the content management and delivery system 110 must first determine which expandable content items are eligible to participate in the selection process. One eligibility factor is expansion direction. In particular, an expandable content item that expands in a particular direction should only be eligible for a selection process if there is space available on the resource (e.g., display area) for the content item environment to expand in that particular direction (e.g., without distorting the expandable content item when expanded). For example, a content item environment at the bottom of a resource 105 should not be served an expandable content item that expands in the "down" direction.

In some implementations, the expansion prediction accuracy system 120 accesses previously generated expansion direction predictions for a particular resource 105 or content item environment on the resource 105 to aid the content management and delivery system 110 in determining which expandable content items are eligible to satisfy the content item request. For example, in response to a content item request, the expansion prediction accuracy system 120 can parse a database storing expansion direction predictions indexed by resource 105 and/or content item environment to identify expansion direction predictions for the resource 105 or content item environment for which the content item request was generated. The operation of the expansion prediction accuracy system 120 is further described below.

For situations in which the systems discussed here collect personal information about users, the users may be provided with an opportunity to opt in/out of programs or features that may collect personal information (e.g., information about a user's social network, social actions or activities, profession, a user's preferences, or a user's current location). In addition, certain data may be anonymized in one or more ways before it is stored or used, so that personally identifiable information is removed or obfuscated. In some implementations, users can opt out of being characterized or targeted for content, including advertisements, based on the interest profiles for which they may be characterized.

Figure 2A:
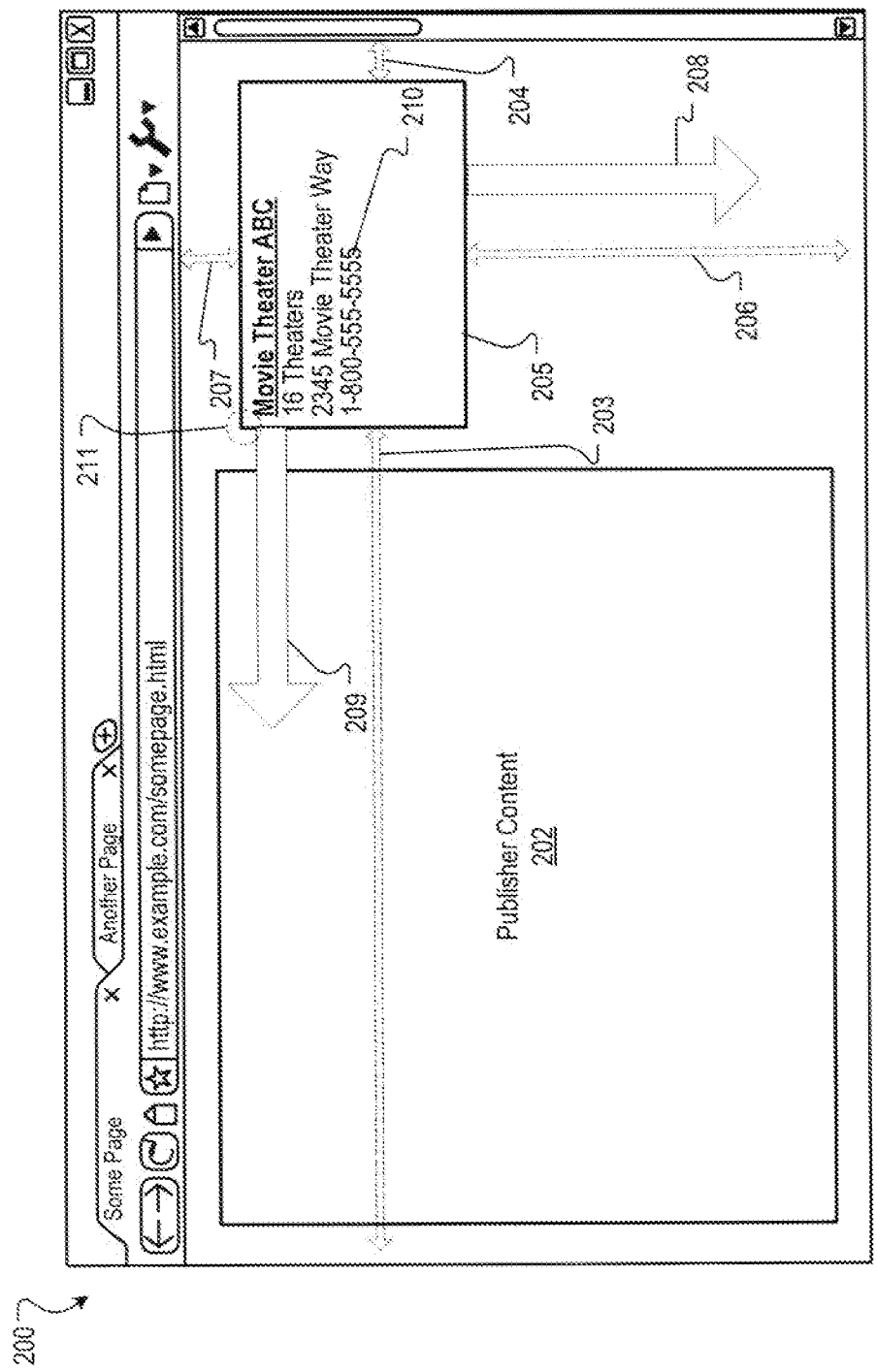
FIG. 2A depicts a browser displaying an expandable content item.

FIG. 2A depicts a browser displaying an expandable content item. For example, FIG. 2A shows an example user interface 200 that displays a resource 105 with publisher content 202 that is authored by a publisher 104. Additionally, the resource 105 includes a content item environment 205 in which a content item from a content provider (e.g., a third party provider) can be rendered. The content management and delivery system 110 can select and provide the content item (e.g., advertisements, etc.) from a pool of available content items.

In some implementations, the one or more content items 210 that are selected for display in the content item environment 205 can be selected by conducting an auction or by another selection process (e.g., reservation). The content items that are eligible to participate in the selection process can be selected by various criteria, such as interest profiles, the relevance of content items to the publisher content 202, to a time of the day, geographical location, keywords, and expansion direction to name a few examples.

Figure 2B:
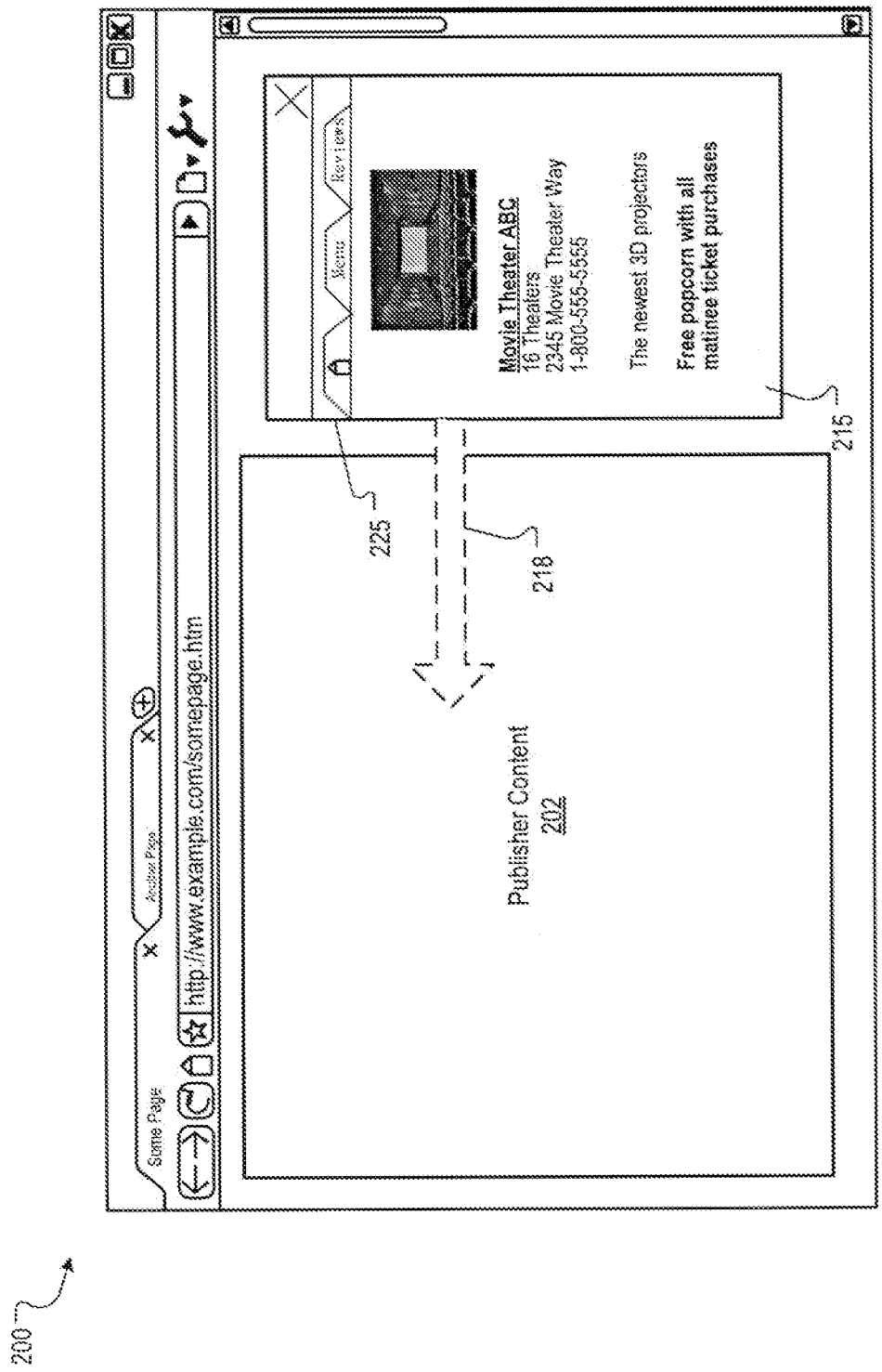
FIG. 2B depicts a browser displaying an expanded form of the expandable content item.

In the case of expandable content items, an unexpanded (initial) form of the content item is initially rendered in the content item environment 205. Depending on the expansion event for which the expandable content item is configured, the expandable content item may expand on the resource load (or shortly after the resource loads, such as after a timed delay), or in response to a user interaction, such as a mouse over or click. For example, an expanded form 215 of the content item 210 is shown in the example of FIG. 2B, which depicts a browser displaying an expanded form 215 of the expandable content item 210. The expanded form of the content item, for example, occupies an area of the resource or viewport greater that occupied by the content item in its unexpanded form. In the example shown, the content item 210 is expanded downward, however the content item 210 may expand in other directions, such as the direction shown by phantom arrow 218.

The expanded form 215 displays additional information. The expanded form 215 can include additional content, for example, images, larger text, audio, video, or web-based content. In one example, the content item 210 is presented first as an advertisement in textual format while enabling the user to expand the advertisement into a menu-driven, graphical advertisement in the expanded form 215. The expanded content item 215 can also include a marker that the user can click or otherwise select such that the expanded content item 215 is replaced by the unexpanded content item 210.

With reference again to FIG. 2A, there are two possible expansion directions available for the content item environment 205 (and the content item 210), given the relative position of the content item environment 205 on the resource 205 in the user interface 200. In particular, the content item environment 205 may expand in a "down" direction 208, or in a "left" direction 209. In some implementations, the content item request for a content item includes the position data as described above. Example position data may include the content item environment 205 dimensions, the location of the content item environment 205 in a viewport or resource 105, and the dimensions of the viewport or resource 105. Other appropriate position data may also be used.

In some implementations, the content item requests also include the respective resource address of the resource on which the content item is to be displayed. For example, the resource address of the resource is the URL of the resource. The resource address can also include an identifier identifying the content item environment.

In the example of FIG. 2A, assume that the content item environment 205 has the following dimensions: a width of 128 units (e.g., pixels), and a height of 80 units (e.g., pixels). Assume also that the border values are the borders defined by the resource 105, which are defined by a width of 456 units, and a height of 240 units. Alternatively, the borders of the viewport, which in FIG. 2A encompass a slightly larger area than the borders of the resource 105, could instead be used. Finally, assume that the content item environment 205 position, as measured from a content item environment 205 origin of the upper left corner of the content item environment 205, as indicted by the phantom circle 211, is at an offset of 312 units in the x-direction and 24 units in the y-direction. These values can be included in the position data.

An eligible expansion direction is a direction for which there is enough display area to display an expansion of an expandable content item (e.g., without violating any relevant expansion requirements as described below). The determination of an eligible expansion direction is dependent on the display configuration of the resource, the display configuration of the expandable content item, the display configuration of the content item environment or a combination thereof. The display configuration of a resource describes the layout of the resource (e.g., the relative position and size of content on the resource), the size/display area of the resource (e.g., X pixels by Y pixels), or a combination thereof. The display configuration of the expandable content item describes the sizes of the content item in expanded and unexpanded forms, the direction(s) of expansion of the content item, or a combination thereof. The display configuration of the content item environment describes the sizes of the content item environment in expanded and unexpanded forms, the direction(s) of expansion of the content item environment, the relative position of the content item environment or a combination thereof.

In some implementations, the expansion direction is dependent on the distance separating a border of the content item environment 205 and a border of the resource 105 or view port of the user device 106. For example, in FIG. 2A, the distances 203, 204, 206 and 207 are, respectively, 312 (i.e., ABS(312−0); 24 (i.e., ABS(0−24)); 136 (i.e., ABS(240−(24+80)); and 64 (i.e., ABS(456−(312+80)).

In some implementations, an eligible expansion direction for a particular direction is determined if the distance in the direction from the content item environment 205 border to the parallel border of the resource 105 (or viewport, if the viewport border is used) without an intervening content item environment 205 border meets a threshold distance. For example, the threshold distance may be 100 display units. Thus, in FIG. 2A, the expansion directions of "down" and "left" are eligible expansion directions, as the respective distances between borders are 136 and 312. The directions of "right" and "up" are not eligible, as the respective distances are 24 and 64.

In variations of these implementations, the content management and delivery system 110 can determine that there are multiple expansion directions of different lengths in each direction. For example, if expandable content items are available for expansions of 80, 120 and 160 display units in the down direction, then the content management and delivery system 110 would determine that "down" direction expansions are available for 80 and 120 display units, but "down" expansions are not available for 160 display units. Thus, content items that expand 160 display units in the down direction would not be eligible to fulfill the request for the content item environment 205.

In additional variations of these implementations, expansion directions are further subject to the requirement that an expansion will not occlude other content on the resource 105 (e.g., publisher content 202), cause such other content to shift or otherwise distort such other content. For example, in FIG. 2A, expanding to the left in the expansion direction 209 would occlude the publisher content 202. In some implementations, to make this determination, a process generating the request determines the location of the publisher content 202 from the document object model of the resource, and includes this position data in the data provided to the content item management and delivery system 110. There, location data describing the area of display is generated (e.g., x- and y-coordinates of the display area for the content 202), and compared to possible expansion dimensions of the content item environment. For example, if the content item environment 205 were to expand 100 units to the left, the x-coordinate of the left most border of the content item environment 205 would be at 212 display units (i.e., 312−100). As the x-coordinate of the right most border of the content display area for the publisher content 202 is approximately 296, which is greater than 212, and the y-coordinates of the content item environment 205 are within the upper and lower y-coordinates of the area in which the publisher content 202 is displayed, the process would determine that the expanded content item environment 205 would occlude the display of the publisher content 202. Accordingly, the "left" direction is not an eligible expansion direction. In some implementations there are no requirements that an expansion not occlude other content, as such requirements may result in a determination that there are no eligible expansion directions (e.g., if the content environment is surrounded by other content or resource borders on all sides).

In some implementations, the content management and delivery system 110 utilizes models (e.g., resource specific models and/or content item environment specific models) to predict a direction of expansion for a content item environment and resource pair based on historical data (expansion direction predictions). An expansion direction prediction is a prediction of one or more directions in which a particular content item environment can expand while satisfying any applicable expansion requirements. Expansion requirements define allowable or permissible expansions of a particular content item environment on a particular resource, as described above. Expansion requirements include, for example, requirements not to occlude or shift other content when the content item is in an expanded form and requirements that the content item not be distorted when displayed in an expanded form (e.g., clipped). Thus the expansion requirements can be dictated by the display configurations of the resource, the content item environment, and/or the content item, by content sponsors of the content items, the publishers 105 and/or other administrators, or a combination thereof.

The content and management deliver system 110 can use the expansion requirements, for example, to evaluate the expansion direction eligibility factor. As described above, the content management and delivery system 110 can weigh the expansion direction eligibility factor in selecting expandable content items that are eligible to fulfill a content item request.

The historical data used to develop the models can be derived from the position data included in the content item requests, the location data for particular content item environments, rendering data reported to the content management and delivery system 110 by user devices 106 after the user devices 106 fully render the resources 105, or some combination thereof. In some implementations, the user devices 106 fully render the resources 105 and report the rendering data to the content management and delivery system 110 in a "ping." The pings can be in the form of reporting messages that include, for example, rendering data specifying the locations and sizes of the content item environments (e.g., the display configurations of the content item environments), and the sizes of the resources in which the content item environments are rendered (e.g., the display configurations of the resources). As the rendering data are generated after a resource 105 is fully rendered, the rendering data are typically more accurate than the position data included in the content item requests, which may be generated before the rendering is complete.

In some scenarios, the content item request is for placement of a content item in a content item environment for which the only content item environment/resource configuration information is from the position data included in the content item request (e.g., the resource or content item environment is new), which as described above, may not provide a true representation of the configuration of the fully rendered resource. In other scenarios, there may be an abundance of historical data for a particular content item environment and resource but, due to changes in the layout of the resource (e.g., adding new content, re-arranging content), the historical data may no longer accurately represent the current configuration of the resource. Regardless of the particular reason, there may be uncertainty about the reliability or veracity of the historical data and the expansion direction predictions based on such historical data. As such, the accuracy of the expansion direction predictions should be determined on an ongoing basis.

Figure 3:
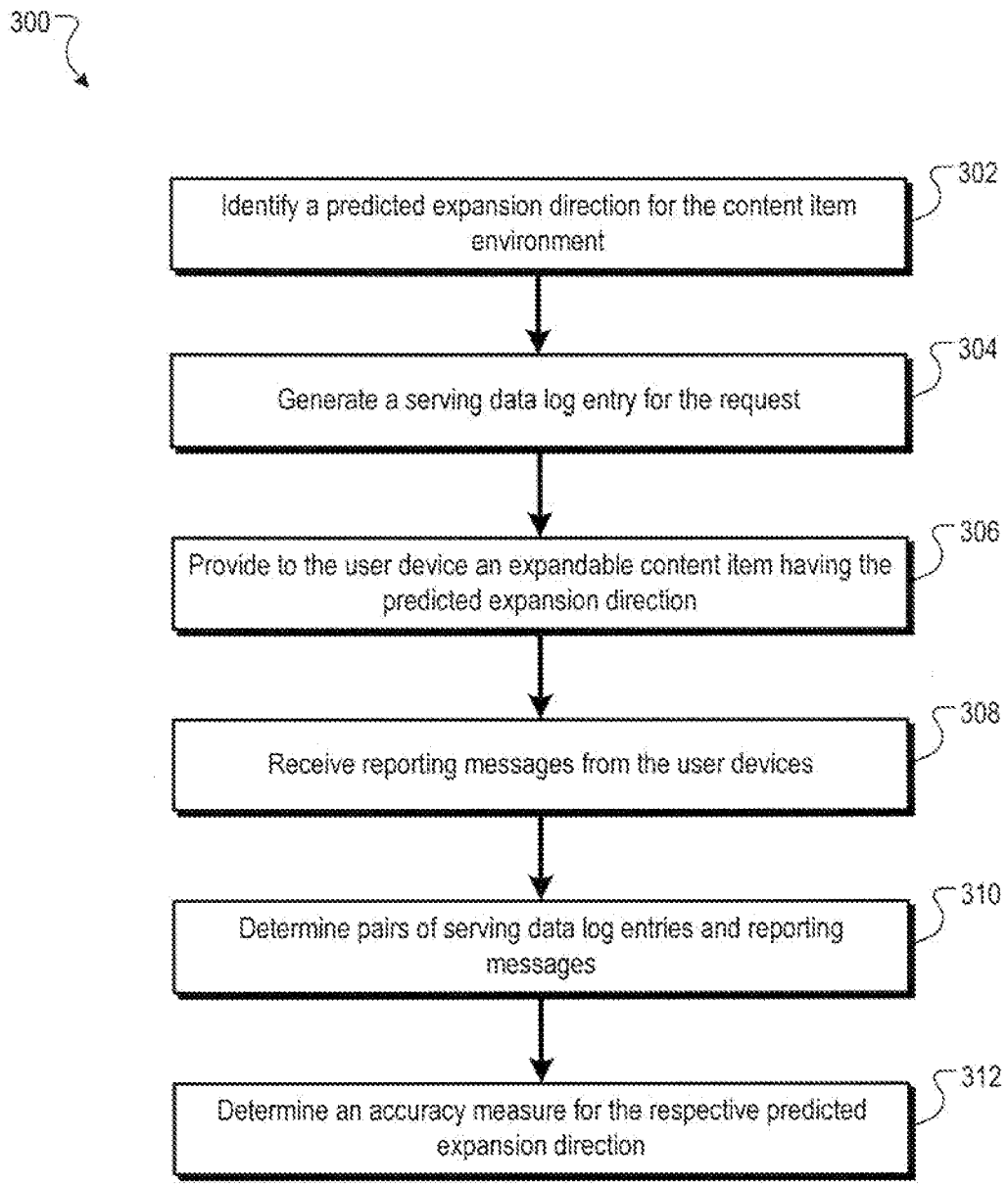
FIG. 3 is a flow diagram of an example process for determining accuracy measures for predicted expansion directions.

Given the relatively high accuracy of the rendering data for recent renderings of resources 105 (e.g., as compared to the position data), the expansion prediction accuracy system 120 can use such recent rendering data to evaluate the accuracy of the expansion direction predictions. An example evaluation process is described with reference to FIG. 3, which is a flow diagram of an example process 300 for determining accuracy measures for predicted expansion directions.

The process 300 identifies, from one or more predicted expansion directions, a predicted expansion direction for the content item environment (302). As described above, the predicted expansion direction is a prediction of one or more directions in which the content item environment can expand based at least in part on the display configuration of the resource (e.g., size of the resource) and/or the content item environment (e.g., size and relative location of the resource). Thus the predicted expansion direction is a prediction of one or more directions in which the content item environment can expand while satisfying all applicable expansion requirements.

The content item request can include an identifier of the content item environment and/or the resource (e.g., a resource address of the resource) on which the requested content item will be displayed. In some implementations, the expansion prediction accuracy system 120 identifies the predicted expansion direction(s) based on such an identifier. For example, the expansion prediction accuracy system 120 can access a data store storing prediction expansion directions (e.g., previously generated by the content management and delivery system 110 when a threshold level of historical data is available) indexed by resource and/or content item environment and identify the predicted expansion direction(s) based on the identifier received with the content item request.

By way of an example, in response to receiving a content item request for a content item to be displayed in the content item environment 205, the expansion prediction accuracy system 120 accesses predicted expansion directions for the content item environment 205 that specify a predicted expansion direction of "down" (e.g., as the relevant expansion requirements mandate that no other content be occluded when an expanded content item is displayed in the content item environment 205).

For content item environments for which the content and delivery management system 110 has not previously generated a predicted expansion direction (e.g., there is no historical data available) or the predicted expansion direction is older than a threshold age, the content and delivery management system 110 can generate the predicted expansion direction in a content item request time process. For example, the content and delivery management system 110 can generate the predicted expansion direction based on the position data included in the content item request. The expansion prediction accuracy system 120, in turn, accesses the predicted expansion direction from the content and delivery management system 110.

The process 300 generates a serving data log entry for the request specifying the predicted expansion direction and a unique identifier for the request (304). In some implementations, the expansion prediction accuracy system 120 generates the serving data log entry for the request. The serving data log entry specifies, for example, the predicted expansion direction(s) for the content item environment in which the selected content item is to be displayed and specifies the unique identifier for the request, which uniquely identifies the request.

In some implementations, the expansion prediction accuracy system 120 can generate the unique identifier, for example, from one or more of the following data sources: the resource address of the resource on which the expandable content item is to be displayed, the time the request is generated by the requesting user device 106 or the time the request is received by the content and management delivery system 110, an address of the requesting user device 106 or a server processing the request for the content and management delivery system 110 (e.g., an IP address), and/or a process identifier of a process running on the server (e.g., an application process identifier). In some implementations, the expansion prediction accuracy system 120 generates a fingerprint (e.g., through use of a hash function) from one or more of the data sources and designates the fingerprint as the unique identifier for the request. The expansion prediction accuracy system 120 can store the serving data log entry for the request in an indexed data store.

The process 300 provides to the user device an expandable content item having the predicted expansion direction and response data specifying the unique identifier (306). An expandable content item that has the predicted expansion direction is an expandable content item that expands in the same direction as that of the predicted expansion direction.

In some implementations, once the expansion prediction accuracy system 120 has identified the predicted expansion direction(s) for the content item environment, as described above, the content and management delivery system 110 submits the eligible expandable content items to a selection process to select an expandable content item to provide to the requesting user device 106. The expansion prediction accuracy system 120 can, for example, provide the unique identifier to the content and management delivery system 110, which, in turn, provides the unique identifier, along with the selected expandable content item, to the requesting user device 106. For example, the content and management delivery system 110 can append data specifying the unique identifier (e.g., fingerprint) to the data provided to the requesting user device 106 specifying the selected expandable content item.

In some implementations, in addition to the data specifying the selected expandable content item and the unique identifier, the content and management delivery system 110 can also provide data specifying instructions (e.g., a script) to the requesting user device 106 that, upon execution by the user device 106, cause the user device 106 to generate and send a reporting message (e.g., in the form of a ping) or other communication to the expansion prediction accuracy system 120. The reporting message includes rendering data for the resource 105 on which the selected content item was rendered and the unique identifier of the content item request to which the selected content item was responsive. As described above, the rendering data specify, for example, the location and size of the content item environment and the size of the resource on which the content item environment is rendered. In some implementations, the rendering data also specify the locations and sizes of other content on the resource (e.g., other publisher content 202).

The content and delivery management system 110 and the expansion prediction accuracy system 120 perform processes 302, 304 and 306 for each of numerous content item requests for both content items for display in the same content item environments and content items for display in different content item environments. As each content item request can result in the respective user device 106 generating a reporting message, numerous reporting messages are provided by user devices to the expansion prediction accuracy system 120 with rendering data for the various content item environments. As described below, the expansion prediction accuracy system 120 can use the reporting messages to determine accuracy measures for the predicted expansion directions.

The process 300 receives reporting messages from the user devices for the respective unique identifiers (308). The user device 106 sends a reporting message in response to fully rendering a resource 105 displaying an expandable content item that satisfied a particular content item request from the user device (e.g., the instructions provided with the expandable content item cause the user device 106 to send the reporting message). The reporting message specifies the unique identifier of the particular content item request, the display configuration of content item environment in which the expandable content item was displayed, and the display configuration of the respective resource. In some implementations, the expansion prediction accuracy system 120 receives the reporting messages and stores the reporting messages in an indexed data store.

As described above, the display configuration data included in a reporting message is often more reliable than the position data included in the corresponding content item request. For example, a reporting message includes display configuration data that specify the relevant content item environment is at an offset of 312 units in the x-direction and 24 units in the y-direction while the position data included in the content item request specify the content item environment is at an offset of 308 units in the x-direction and 14 units in the y-direction. As described above, the discrepancy results from, for example, the position data being generated prior to the resource being fully rendered and the display configuration data being generated after the resource has been fully rendered.

The process 300 determines pairs of serving data log entries and reporting messages based on the unique identifiers (310). Each pair is a pair of a serving data entry and a reporting message having a matching unique identifier. For example, the expansion prediction accuracy system 120 identifies a first serving data log entry with a unique identifier of X76HJ90K and a first reporting message with a unique identifier of X76HJ90K, determines that the first serving data log entry and the first reporting message have matching unique identifiers and determines that the first serving data log entry and the first reporting message are a serving data log entry/reporting message pair.

As each unique identifier is globally unique to only one serving data log entry and one reporting message, a particular serving data log entry will have only one matching reporting message and, likewise, a particular reporting message will have only one matching serving data log entry. The expansion prediction accuracy system 120 can determine serving data log entry/reporting message pairs in a reporting message receipt time process or in a later, offline process.

The process 300, for each serving data log entry/reporting message pair, determines an accuracy measure for the respective predicted expansion direction based at least in part on a comparison of the respective predicted expansion direction and the display configurations of the respective resource and content item environment (312). For example, the expansion prediction accuracy system 120 determines the accuracy measure for the serving data log entry/reporting message based on a comparison of the predicted expansion direction in the serving data log of the serving data log entry/reporting message pair and the display configurations of the resource and content item environment in the reporting message of the serving data log entry/reporting message pair. The accuracy measure represents an accuracy of the respective predicted expansion direction being a match for the respective resource and content item environment.

A predicted expansion direction that matches the content item environment for which it predicts the expansion direction means that the content item environment can expand in the predicted expansion direction while satisfying each and every applicable expansion requirement. For example, if the applicable expansion requirement requires no clipping, the predicted expansion direction is "down" and the configuration of the content item environment and corresponding resource permit an expanded content item in the content item environment to expand down without being clipped (e.g., as the content item environment is in the top-left corner of the resource) then predicted expansion direction matches the content item environment. Conversely, if the applicable expansion requirement requires no clipping, the predicted expansion direction predicts an expansion direction of "up" and the configuration of the content item environment and corresponding resource do not permit an expanded content item in the content item environment to expand up without being clipped (e.g., as the content item environment is in the top-left corner of the resource) then predicted expansion direction does not match the content item environment. Thus the accuracy measure represents whether a content item environment could expand in the predicted expansion direction while satisfying each and every applicable expansion requirement as opposed to whether the content item environment actually expanded in the rendered resource in the predicted expansion direction.

More generally, determining the accuracy measure includes determining whether the expandable content item, when displayed in content item environment in its expanded form, is within the display area of the resource (e.g., does not need to expand beyond the borders of the resource to be displayed in its expanded form). In some implementations, the display area of the resource in which the expanded content item can be displayed is limited not only by the borders of the resource but also by any applicable expansion requirements. For example, with reference to FIG. 2A, even though the borders of the resource 105 would permit the content item environment 205 and content item 210 to expand to the left (direction 209) over the publisher content 202, if there was an expansion requirement that no other resource content be occluded when the content item is in its expanded form then the display area for the resource 105 would not include the area occupied by the publisher content 202.

In some scenarios, the predicted expansion direction can include predictions of expansion directions in more than one direction. For example, the predicted expansion direction can be "up" and "right" directions. In such scenarios, the expansion prediction accuracy system 120 can determine whether each predicted expansion direction match content item environment. For example, if the applicable expansion requirement requires no clipping and the content item environment is in the top-left corner of the resource then the predicted expansion direction for the "up" direction does not match the content item environment while the predicted expansion direction for the "right" direction does match the content item environment.

In some implementations, the accuracy measure can be determined for each serving data log entry/reporting message pair and be a binary indicator of accuracy. For example, the accuracy is high if the predicted expansion direction matches the content item environment for the pair and the accuracy is low if the predicted expansion direction does not match the content item environment for the pair.

In some implementations, as there may be numerous serving data log entry/reporting message pairs for the same content item environment (e.g., a particular ad slot on a particular web page) and predicted expansion direction, the accuracy measure can be a function of the accuracy measures from each of the serving data log entry/reporting message pairs for the content item environment and predicted expansion direction. For example, the accuracy measure for a content item environment and predicted expansion direction can be measured in terms of a normalized scale (e.g., 0-100) based on an aggregation of the individual measures of accuracy from each of the serving data log entry/reporting message pairs (e.g., 75 of 100 accuracy measures of individual pairs indicate a match so the aggregate accuracy measure for the content item environment and predicted expansion direction is 75%). However, the accuracy can be measured in other ways as well.

The content and delivery management system 110 can use the accuracy measures, for example, to revise or select the model(s) utilized to generate the predictions to generate more accurate predictions. For example, the content and delivery management system 110 can use the accuracy measures to identify accurate and inaccurate predictions for use as training data to train the model to increase its accuracy or to select another model that results in more accurate predictions.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal and does not include transitory signals, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 4:
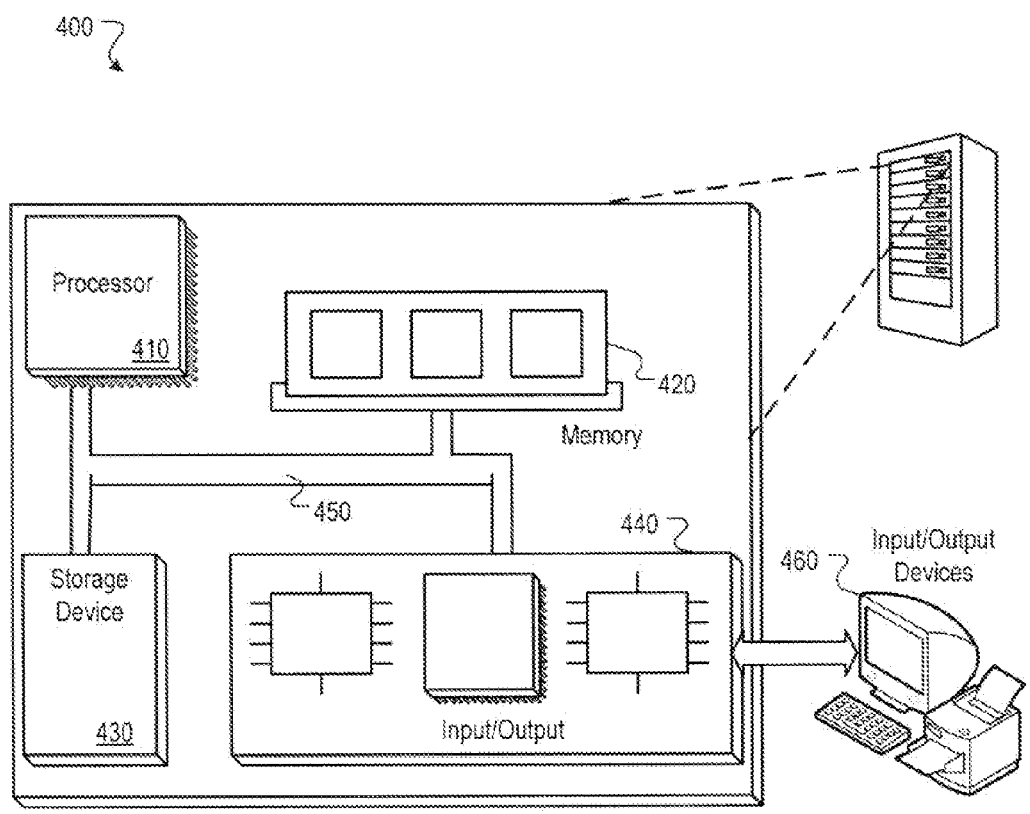
FIG. 4 is a block diagram of a programmable processing system.

An example of one such type of computer is shown in FIG. 4, which shows a block diagram of a programmable processing system (system). The system 400 that can be utilized to implement the systems and methods described herein. The architecture of the system 400 can, for example, be used to implement a computer client, a computer server, or some other computer device.

The system 400 includes a processor 410, a memory 420, a storage device 430, and an input/output device 440. Each of the components 410, 420, 430, and 440 can, for example, be interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 300. In one implementation, the storage device 430 is a computer-readable medium. In various different implementations, the storage device 430 can, for example, include a hard disk device, an optical disk device, or some other large capacity storage device.

The input/output device 440 provides input/output operations for the system 400. In one implementation, the input/output device 440 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 460.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a data processing apparatus, comprising:
for each of a plurality of requests for content items, each request received from a user device for an expandable content item to be displayed in a content item environment on a resource and specifying a resource address of the resource:
identifying, from one or more predicted expansion directions, a predicted expansion direction for the content item environment based at least in part on the resource address, the predicted expansion direction specifying a predicted direction for expansion of the content item environment displayed on the resource based at least in part on a display configuration of the resource;
generating a serving data log entry for the request specifying the predicted expansion direction and a unique identifier for the request;
providing to the user device an expandable content item having the predicted expansion direction and response data specifying the unique identifier;
receiving reporting messages from the user devices for the respective unique identifiers specifying the display configurations of the respective resources and display configurations of content item environments on the respective resources in which the respective expandable content items were displayed;
determining pairs of serving data log entries and reporting messages based on the unique identifiers, each of the pairs being a pair of a serving data entry and a reporting message having a matching unique identifier; and
for each pair, determining an accuracy measure for the respective predicted expansion direction based at least in part on a comparison of the respective predicted expansion direction and the display configurations of the respective resource and content item environment, the accuracy measure representing an accuracy of the respective predicted expansion direction being a match for the respective resource and content item environment.

2. The method of claim 1, wherein the expandable content item has an initial form and an expanded form, the expanded form being an expansion of the expandable content item in one or more expansion directions, the expandable content item in the expanded form having an area greater than the expandable content item in the initial form.

3. The method of claim 2, wherein:
the display configuration of a respective resource specifies a display area of the respective resource;
the display configuration of a respective content item environment specifies a display area of the respective content item environment and a relative position of the respective content item environment on the respective resource; and
determining the accuracy measure comprises determining whether the respective expandable content item displayed in the respective content item environment in the expanded form in the expansion direction is within the display area of the respective resource based at least in part on the display area of the respective resource and the relative position and display area of the respective content item environment.

4. The method of claim 1, wherein generating the serving data log entry comprises:
generating the unique identifier for the request based at least in part on the resource address of the resource, a time the request was received, and an apparatus address of an apparatus that received the request.

5. The method of claim 4, wherein generating the unique identifier comprises:
generating a fingerprint of the request based at least in part on the resource address of the resource, the time the request was received, and the apparatus address of the apparatus that received the request; and
designating the fingerprint as the unique identifier.

6. The method of claim 5, wherein providing the expandable content item having the predicted expansion direction and response data specifying the unique identifier comprises:
providing data specifying the expandable content item; and
appending data specifying the fingerprint to the data specifying the expandable content.

7. The method of claim 1, wherein identifying a predicted expansion direction comprises requesting the predicted expansion direction from a data store storing the one or more predicted expansion directions based at least in part on the resource address of the resource.

8. A system comprising:
one or more data processors; and
instructions stored on a computer storage apparatus that when executed by the one or more data processors cause the one or more data processors to perform operations comprising:
for each of a plurality of requests for content items, each request received from a user device for an expandable content item to be displayed in a content item environment on a resource and specifying a resource address of the resource:
identifying, from one or more predicted expansion directions, a predicted expansion direction for the content item environment based at least in part on the resource address, the predicted expansion direction specifying a predicted direction for expansion of the content item environment displayed on the resource based at least in part on a display configuration of the resource;
generating a serving data log entry for the request specifying the predicted expansion direction and a unique identifier for the request;
providing to the user device an expandable content item having the predicted expansion direction and response data specifying the unique identifier;
receiving reporting messages from the user devices for the respective unique identifiers specifying the display configurations of the respective resources and display configurations of content item environments on the respective resources in which the respective expandable content items were displayed;
determining pairs of serving data log entries and reporting messages based on the unique identifiers, each of the pairs being a pair of a serving data entry and a reporting message having a matching unique identifier; and
for each pair, determining an accuracy measure for the respective predicted expansion direction based at least in part on a comparison of the respective predicted expansion direction and the display configurations of the respective resource and content item environment, the accuracy measure representing an accuracy of the respective predicted expansion direction being a match for the respective resource and content item environment.

9. The system of claim 8, wherein the expandable content item has an initial form and an expanded form, the expanded form being an expansion of the expandable content item in one or more expansion directions, the expandable content item in the expanded form having an area greater than the expandable content item in the initial form.

10. The system of claim 9, wherein:
the display configuration of a respective resource specifies a display area of the respective resource;
the display configuration of a respective content item environment specifies a display area of the respective content item environment and a relative position of the respective content item environment on the respective resource; and
determining the accuracy measure comprises determining whether the respective expandable content item displayed in the respective content item environment in the expanded form in the expansion direction is within the display area of the respective resource based at least in part on the display area of the respective resource and the relative position and display area of the respective content item environment.

11. The system of claim 8, wherein generating the serving data log entry comprises:
generating the unique identifier for the request based at least in part on the resource address of the resource, a time the request was received, and an apparatus address of an apparatus that received the request.

12. The system of claim 11, wherein generating the unique identifier comprises:
generating a fingerprint of the request based at least in part on the resource address of the resource, the time the request was received, and the apparatus address of the apparatus that received the request; and
designating the fingerprint as the unique identifier.

13. The system of claim 12, wherein providing the expandable content item having the predicted expansion direction and response data specifying the unique identifier comprises:
providing data specifying the expandable content item; and
appending data specifying the fingerprint to the data specifying the expandable content.

14. The system of claim 8, wherein identifying a predicted expansion direction comprises requesting the predicted expansion direction from a data store storing the one or more predicted expansion directions based at least in part on the resource address of the resource.

15. A computer-readable storage medium having instructions stored thereon, which, when executed by one or more data processors, causes the one or more processor to perform operations comprising:
for each of a plurality of requests for content items, each request received from a user device for an expandable content item to be displayed in a content item environment on a resource and specifying a resource address of the resource:
identifying, from one or more predicted expansion directions, a predicted expansion direction for the content item environment based at least in part on the resource address, the predicted expansion direction specifying a predicted direction for expansion of the content item environment displayed on the resource based at least in part on a display configuration of the resource;
generating a serving data log entry for the request specifying the predicted expansion direction and a unique identifier for the request;
providing to the user device an expandable content item having the predicted expansion direction and response data specifying the unique identifier;
receiving reporting messages from the user devices for the respective unique identifiers specifying the display configurations of the respective resources and display configurations of content item environments on the respective resources in which the respective expandable content items were displayed;
determining pairs of serving data log entries and reporting messages based on the unique identifiers, each of the pairs being a pair of a serving data entry and a reporting message having a matching unique identifier; and
for each pair, determining an accuracy measure for the respective predicted expansion direction based at least in part on a comparison of the respective predicted expansion direction and the display configurations of the respective resource and content item environment, the accuracy measure representing an accuracy of the respective predicted expansion direction being a match for the respective resource and content item environment.

16. The computer-readable storage medium of claim 15, wherein the expandable content item has an initial form and an expanded form, the expanded form being an expansion of the expandable content item in one or more expansion directions, the expandable content item in the expanded form having an area greater than the expandable content item in the initial form.

17. The computer-readable storage medium of claim 16, wherein:
the display configuration of a respective resource specifies a display area of the respective resource;
the display configuration of a respective content item environment specifies a display area of the respective content item environment and a relative position of the respective content item environment on the respective resource; and
determining the accuracy measure comprises determining whether the respective expandable content item displayed in the respective content item environment in the expanded form in the expansion direction is within the display area of the respective resource based at least in part on the display area of the respective resource and the relative position and display area of the respective content item environment.

18. The computer-readable storage medium of claim 15, wherein generating the serving data log entry comprises:
generating the unique identifier for the request based at least in part on the resource address of the resource, a time the request was received, and an apparatus address of an apparatus that received the request.

19. The computer-readable storage medium of claim 18, wherein generating the unique identifier comprises:
generating a fingerprint of the request based at least in part on the resource address of the resource, the time the request was received, and the apparatus address of the apparatus that received the request; and
designating the fingerprint as the unique identifier.

20. The computer-readable storage medium of claim 19, wherein providing the expandable content item having the predicted expansion direction and response data specifying the unique identifier comprises:
    providing data specifying the expandable content item; and
    appending data specifying the fingerprint to the data specifying the expandable content.

* * * * *